E. B. McCARTNEY.
CONVERTIBLE CULTIVATOR TRACTOR.
APPLICATION FILED OCT. 31, 1919.
1,345,498.
Patented July 6, 1920.
5 SHEETS—SHEET 1.
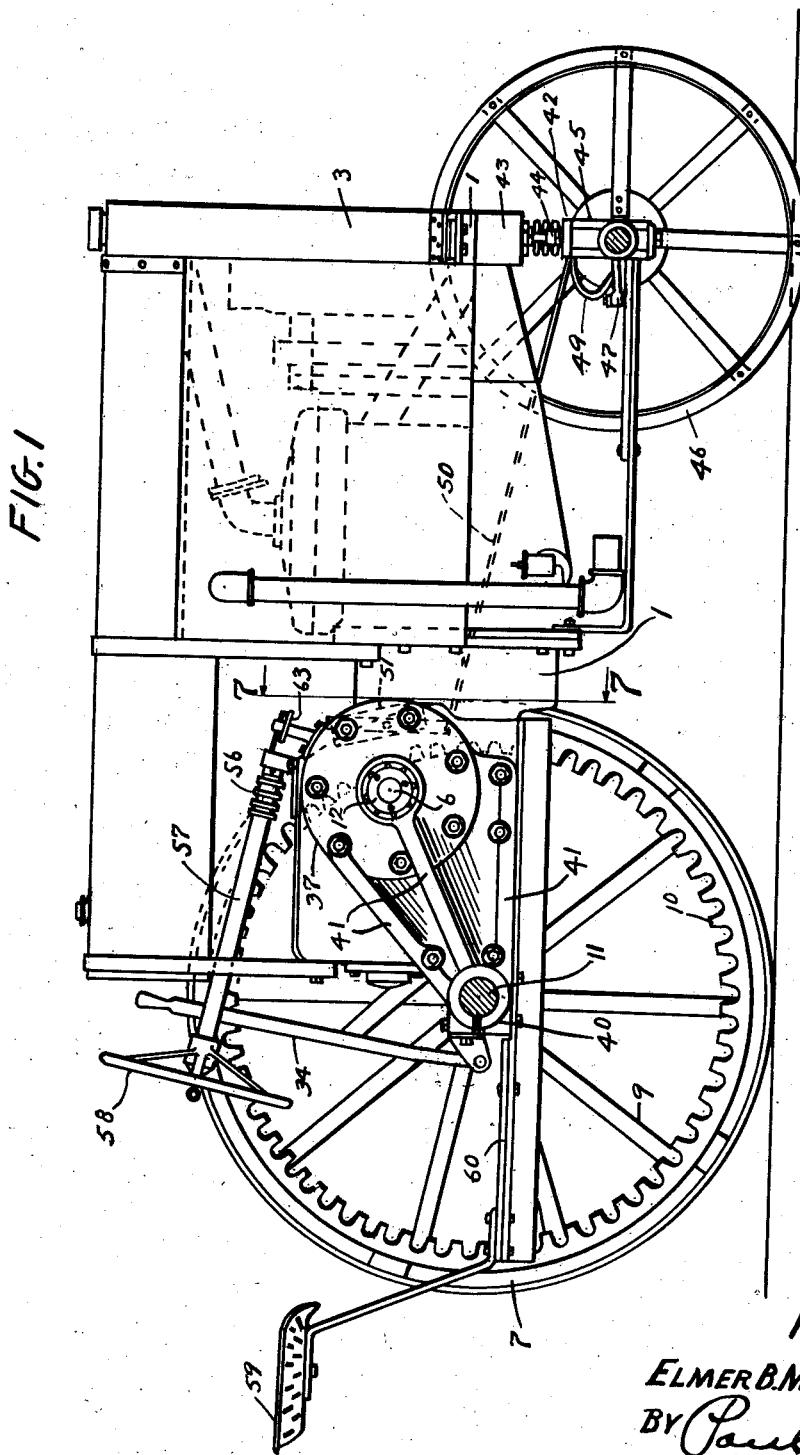
INVENTOR
ELMER B. McCARTNEY
BY Paul & Paul
HIS ATTORNEYS.

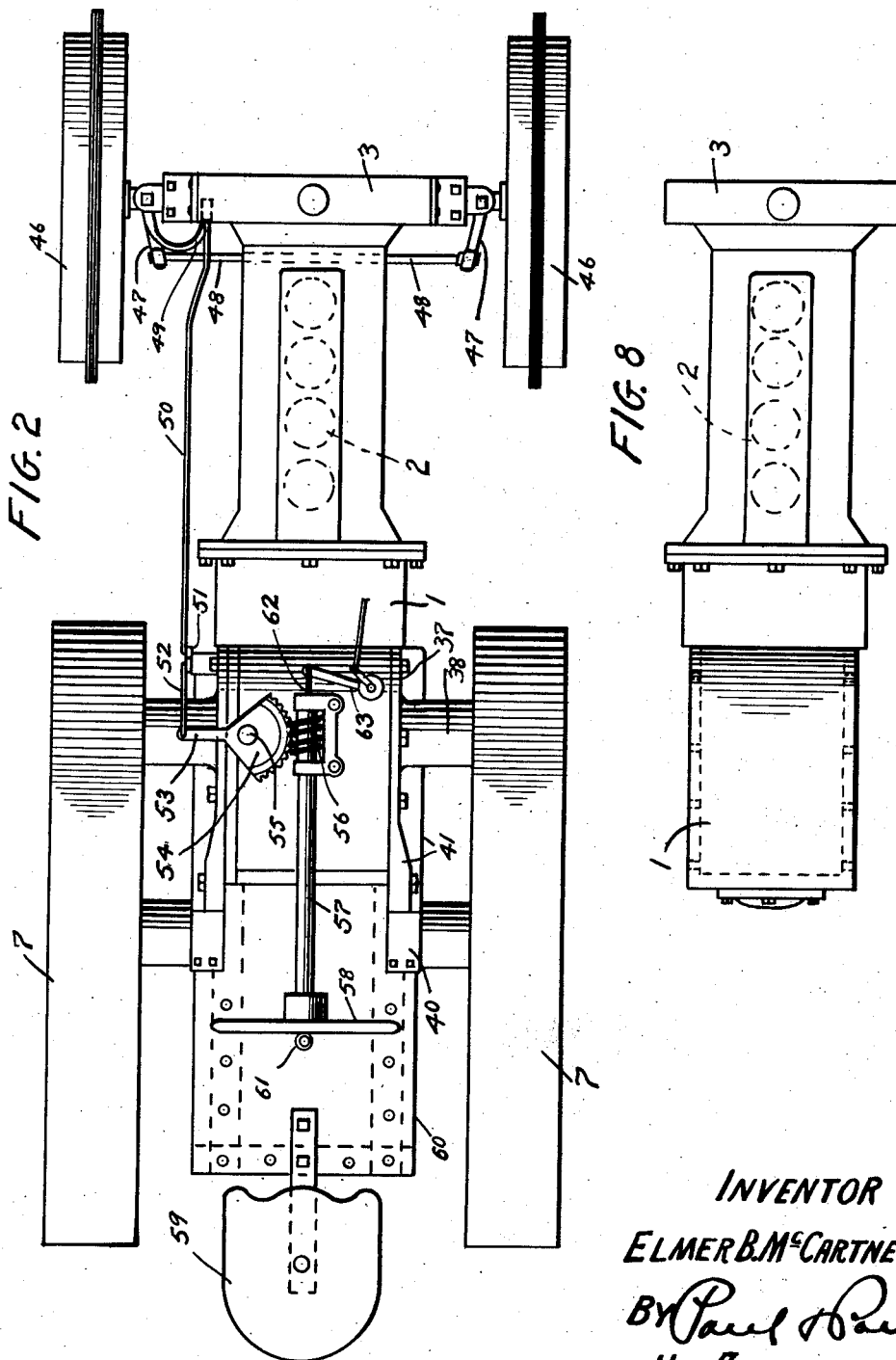

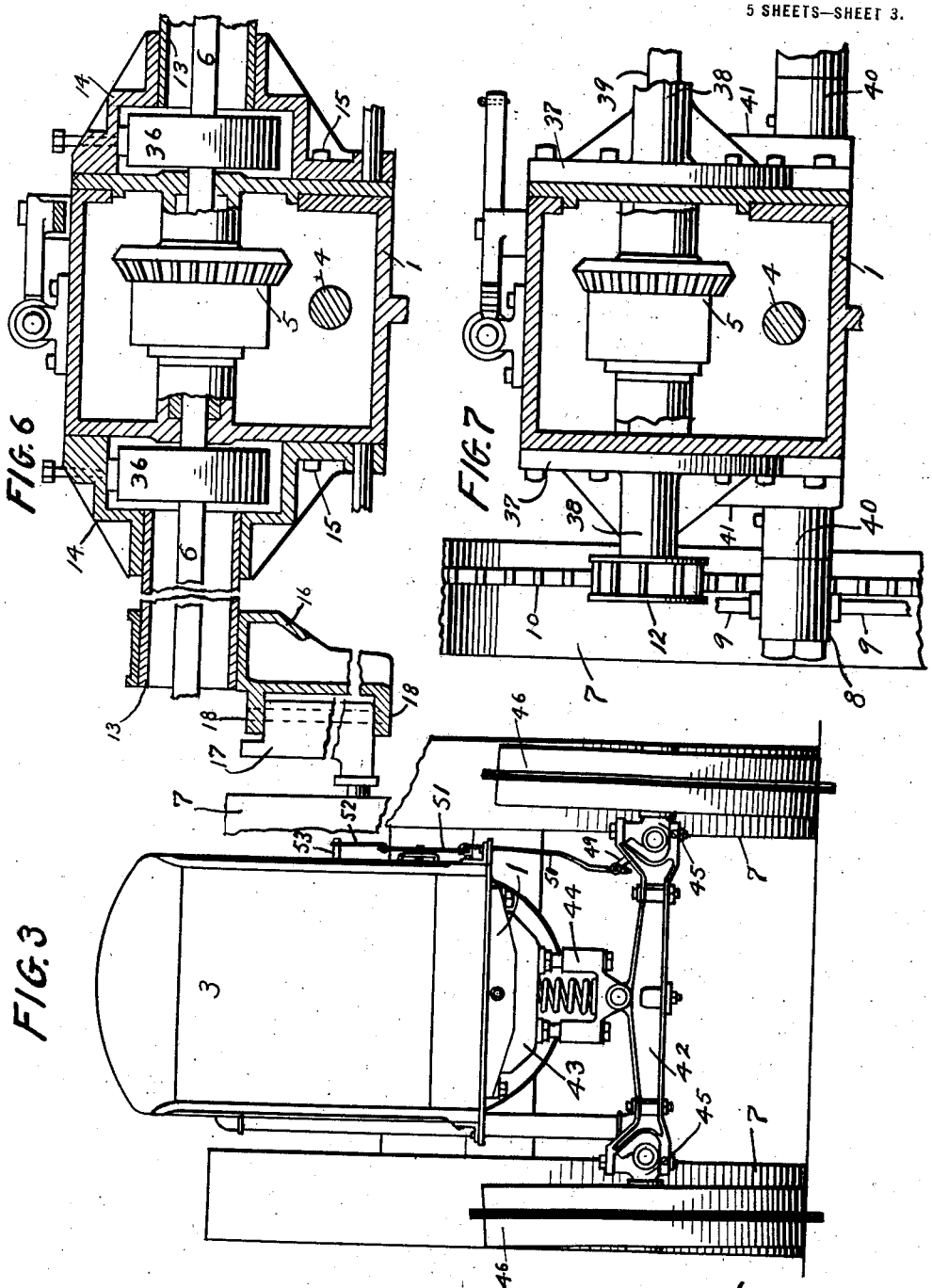

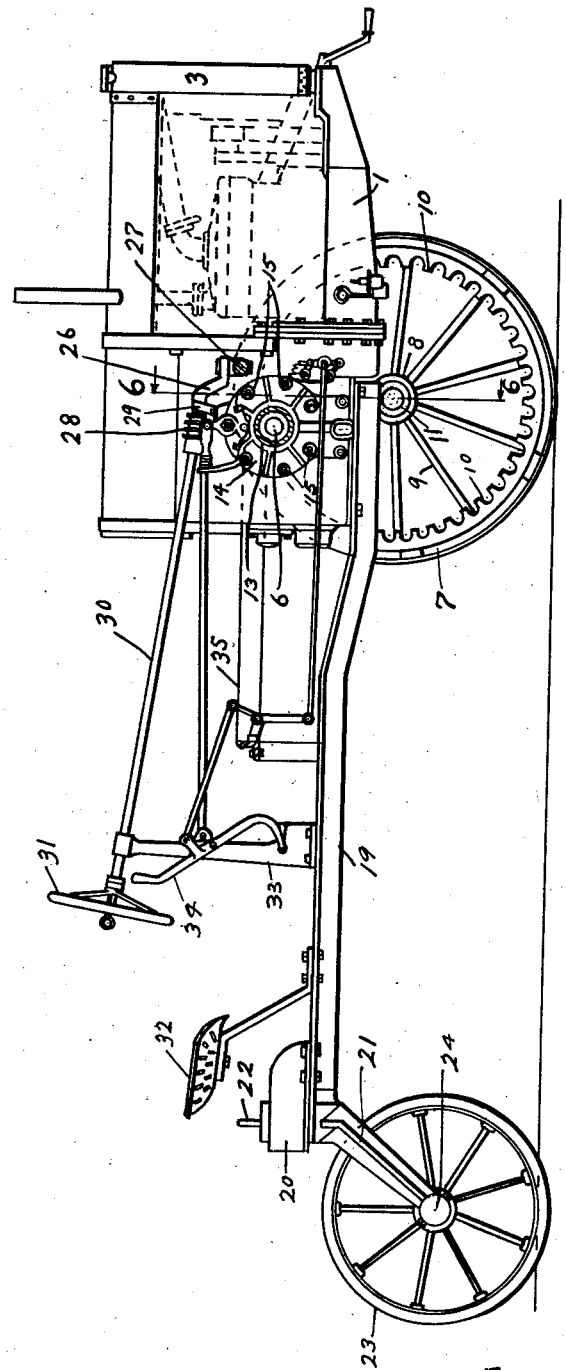

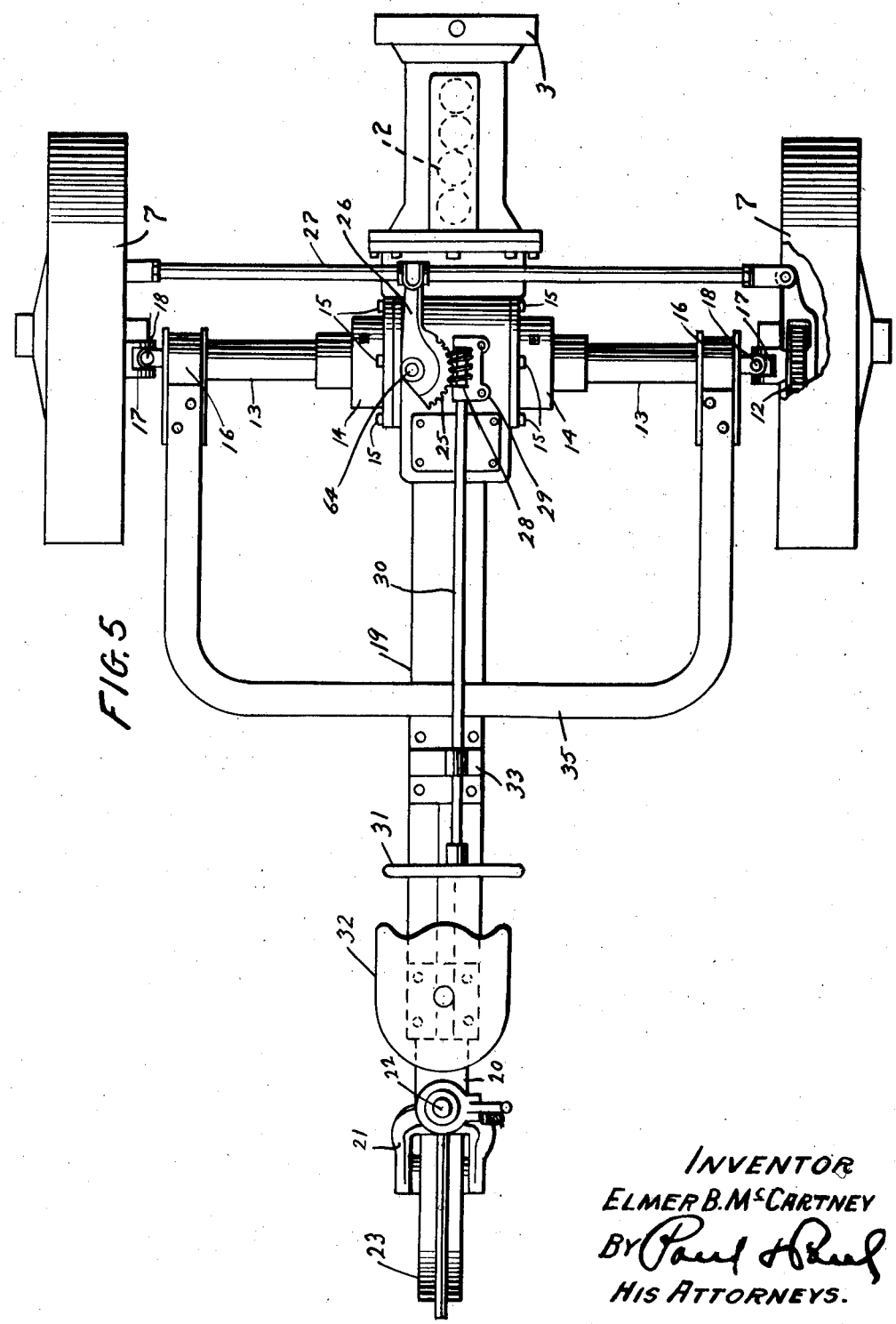

UNITED STATES PATENT OFFICE.

ELMER B. McCARTNEY, OF MINNEAPOLIS, MINNESOTA, ASSIGNOR TO TORO MOTOR COMPANY, OF MINNEAPOLIS, MINNESOTA, A CORPORATION OF MINNESOTA.

CONVERTIBLE CULTIVATOR-TRACTOR.

1,345,498.        Specification of Letters Patent.      Patented July 6, 1920.

Application filed October 31, 1919. Serial No. 334,871.

*To all whom it may concern:*

Be it known that I, ELMER B. McCARTNEY, a citizen of the United States, and resident of Minneapolis, in the county of Hennepin and State of Minnesota, have invented certain new and useful Improvements in Convertible Cultivator-Tractors, of which the following is a specification.

This invention relates to a convertible mechanism which may be converted from a power driven cultivator to a tractor adapted for usual hauling and traction purposes and vice versa. The common tractor is usually of a standard wheel tread and clearance. The tractor used in cultivating has a relatively high clearance and a relatively wide tread, so that the cultivator implements may be drawn between rows of growing corn, cotton, or other row crops, and the high clearance permits the tractor to pass over the plant rows without contact.

Broadly, this invention comprehends a unit power plant including a power generating and transmission means, and a casing or frame carrying the parts. This power plant is adapted to have two interchangeable sets of supporting members by means of which it may readily and easily be changed from a power drawn cultivator to a tractor for hauling purposes and vice versa.

An object of the invention is to provide a convertible power-driven cultivator-tractor.

A more specific object is to provide a tractor which has a unit power plant with interchangeable supporting members by means of which it may be converted from a cultivator tractor with a high clearance and relatively wide tread into an ordinary tractor of standard tread and clearance, and vice versa.

Other objects of the invention will more fully appear from the following description and the accompanying drawings, and will be pointed out in the annexed claims.

In the accompanying drawings, there has been disclosed a structure designed to carry out the objects of the invention, but it is to be understood that the invention is not confined to the exact features shown, as various changes may be made within its reasonable scope.

In the drawings:

Figure 1 is a side elevation of the tractor with one driving wheel omitted,

Fig. 2 is a plan of the tractor,

Fig. 3 is a front elevation of the tractor,

Fig. 4 is a side elevaton of the cultivator tractor, with one driving wheel omitted, Fig. 5 is a plan view of the device shown in Fig. 4, Fig. 6 is a section on the line 6—6 of Fig. 4, Fig. 7 is a section on the line 7—7 of Fig. 1, Fig. 8 is a plan view of the unit power plant, Solely for the purposes of describing this invention the two forms into which this tractor may be converted will be referred to the traction form or type, such for example as shown in Figs. 1, 2 and 3; while the other type will be referred to as the cultivator type. Secondly, it is to be understood that the conversion may be made from one type to another and vice versa, and for convenience and clarity of description the cultivator type will be first set forth and the detachable parts pointed out, and then the interchangeable converting parts.

The form of the cultivator tractor here shown is substantially like that shown and described in the prior pending application of the inventor hereof, Serial No. 296,372, filed May 12, 1919, to which reference is hereby made. This convertible tractor invention includes a unit power plant such as is indicated in the plan view shown in Fig. 8. It is provided with a unitary casing or frame 1 and comprehends a power generating means such as the usual four-cylinder vertical internal combustion engine 2 with associated parts such as radiator 3, clutch and transmission. As the invention does not inhere in such parts, so far as this application is concerned, they are more or less diagrammatically indicated and need not be described in detail. The primary power shaft 4 (see Fig. 6) of the engine is 10, adapted to actuate a bevel gear 5 meshing with the usual differential gearing which differentially drives the two driving shafts 6 extending transversely of the power plant frame 1.

The major portion of the weight in both types of this convertible tractor is carried by means of the drive wheels 7. These wheels are provided with hubs 8 and spokes 9 and driving gears 10. The wheel hubs 8 are adapted to be journaled on axle pins 11.

The supporting members, which may be detachably secured to this power plant unit in assembling a cultivator tractor, include a pair of members 13, one extending from and detachably secured to, each side of the frame 1. These are preferably tubular and project horizontally from the frame and are detachably secured to heads 14. Each of these two heads 14 is detachably fastened to the frame 1 by means of bolts 15 and are arranged in axial alinement on opposite sides of the frame. The two opposed and differentially driven shafts 6 extend through the tubular members 13. A short driving shaft is terminably coupled to each shaft 6 by the usual universal coupling and a pinion 12 is carried fast on each short shaft. Each pinion 12 engages an internal gear 10 carried by each drive wheel 7 whereby the drive wheels are differentially driven. The outer end of each tubular supporting member 13 is provided with a depending arm such as a steering knuckle yoke 16 carrying a steering knuckle 17 pivoted between the ears 18. Each knuckle 17 provides a bearing for one axle pin 11 of a driving wheel. It will be seen that by this construction the tubular members 13 and the depending arms or yoke 16 provide the bearing for the supporting axles of the driving wheels and that, by reason of the central location of the power plant frame 1 and the elevated position of the tubular supporting members 13, a high ground clearance is provided between the wheels and frame for the rows of crops and that the heavier parts and frame may occupy a low center-of-gravity position without at all interfering with the plant rows to be cultivated. Further, the relatively long reach of the tubular supporting members 13 provides a wide tread for the wheels, so that this tractor form is particularly suitable for the attachment of the standard two-row cultivator parts.

In the cultivator type, a secondary wheeled supporting means adapted to be detachably secured to the frame is provided, and, this embodiment of the invention, preferably comprises a single rear wheel arranged so that it is midway the drive wheel tread and may, therefore, travel between contiguous plant rows. This rear wheel assembly is demountably secured to the frame 1. This is preferably effected by means of a trailer bar 19, the forward end portion of which is detachably secured to the under face of the frame 1, substantially in its median line. Rearwardly extending, this trailer bar 19 carries a terminal bracket 20 in which is pivotally mounted a forked caster arm 21. The pivoted mounting of the forked caster arm 21 is effected by means of the upright pin 22. The trailer wheel 23 is journaled in suitable bearings on a pin 24 in the forked arm 21.

It will be noted that the front tubular supporting members 13 and the trailer bar 19 form the only necessary supporting parts for the power unit frame 1 and that the need for a separate frame is eliminated.

In the cultivator form, the steering is preferably effected by the front or drive wheels. A sector 25 is pivotally mounted on the upper face of the frame 1 by means of the pin 64. This sector is provided with an arm 26 pivotally connected to the transverse rod 27 which, at each end, is pivotally connected to a steering knuckle 17 mounted in a yoke 16 by which knuckles the drive wheels 7 are borne. A worm 28, meshing with the sector, is mounted in the bracket 29 on the frame 1. This worm 28 is provided on the demountable steering wheel rod 30 which is actuable by the steering wheel 31 provided within easy reach of a driver's seat 32 arranged on the trailer bar 19. A standard 33, mounted on the bar 19, functions to support the rod 30 and one or more levers 34 by which the engine may be controlled or operated.

As shown in Fig. 5, a yoke frame 35 is detachably bolted to the axial tubular supporting members 13. This yoke frame carries the usual cultivator parts and the adjusting and controlling connections between the operating levers and the usual cultivator elements. But, as this arrangement forms no part of this invention, it is not further shown or described. It may be noted that in this cultivator form wherein the steering is effected by the drive wheels, it is preferable to provide brake drums on the differentially driven shafts 6 so that the rotation of each shaft 6 may be independently slowed or stopped entirely and the differential action of the other shaft provides a very short turning radius for this power cultivator. Such is the function of the individually controlled brake mechanisms 36 provided in the heads 14 as shown in Fig. 6.

In the conversion of the cultivator form to the traction form, all the supporting members are removed from the frame 1 so that there remains but the unit power plant and its casing or frame 1. Broadly considered, the extended horizontal members 13, heads 14, and trailer bar 19 are removed and short supporting members without depending arms, different heads and a front wheel and axle assembly are employed to support the uniting frame, thus to provide a tractor for hauling purposes or, as above termed for purposes of description, the traction form. In this form the drive wheels 7 are relatively close to the frame sides so that the relatively narrower or substantially standard tread is attained, the clearance is less and the steering is effected by the front wheels instead of by the drive wheels.

The set of supporting members for the traction form includes a pair of supporting members adapted to be detachably and oppositely secured to the sides of the frame 1 and to be borne by the drive wheels. These drive wheel supporting members are preferably in the form of a pair of similar opposed castings, each comprising a substantially circular head 37 having an integral portion rearwardly and downwardly extending and providing a bearing for an axle 11 of one drive wheel. Each head 37 is provided with a short tubular member or portion 38 in axial alinement with the differentially driven shafts 39. These opposed shafts 39 are shorter than the shafts 6 employed with the cultivator form but are similarly driven by the primary shaft 4 through the bevel gear 5 and the same differential gearing carried by the frame 1. These shafts 39 extend through the casting heads 37 and tubular portions 38 and each has fixed thereon one of the driving pinions 12 which mesh with the gears 10 and thereby actuate the drive wheels 7. The lower end of each casting is also provided with an extension member or tubular portion 40 which provides a bearing for the axle pins of the drive wheels. Preferably these castings are provided with integral projecting ribs 41 for purposes of greater strength and rigidity, and the castings are bolted to the frame.

A front axle and wheel assembly provides the third point of support for the frame in this traction form. This assembly takes the place of the trailer wheel and bar support, and, as shown in Fig. 3, includes a block 43 demountably secured to the frame 1. This block has, suitably fastened thereto, the spring tension standard 44 which in turn is secured to and supported by the axle 42. The opposite ends of the axle, in accordance with common practice are provided with steering knuckles 45 pivotally mounted between the forked ends of the axle 42. These knuckles each provide a bearing for the front steering wheels 46. Each knuckle is provided with a short rod 47 joined to a transverse connecting rod 48 adapted to cause the wheels to turn simultaneously. One of the steering knuckles 46 has the arcuate rod 49 secured thereto. This rod 49 is secured at its other end to the rearwardly and upwardly extending steering rod 50. The upper end of this steering rod 50 is secured to one end of a lever 51 pivoted on the frame, the other end being operatively connected, by the link 52, to the arm 53 of the toothed sector 54. This sector is mounted on the upper face of the frame on the pivot pin 55 and is adapted to engage the worm 56 on the steering wheel rod 57, which has the usual steering wheel 58 secured thereto.

A seat 59 for the operator is provided on a platform 60, which is demountably bolted to the under face of the rear portion of the frame 1.

The fuel throttle 61 is herein shown on the steering wheel center. A rod 62 is connected thereto and is passed through the tubular steering rod 57 and secured to one end of a bell crank lever 63 to the other end of which is secured the rod adapted to control the engine carbureter in the usual manner.

There is thus provided a tractor which may easily and quickly be changed at will from a power cultivator or cultivator-tractor to a tractor adapted for hauling or traction purposes. The number of parts to be substituted is small, the efficiency of both forms is high, the simplicity of conversion is readily apparent to any user and the tools required to effect the conversion are few.

Having thus described my invention, what I claim as new and desire to secure by Letters Patent is:

1. A convertible tractor having a power unit including power generating means, transmission, differential gearing and a frame therefor, and drive wheels, in combination with interchangeable sets of supporting members adapted to be demountably secured to said frame to provide either a cultivator form or a traction form; the cultivator set including tubular horizontally extending supporting members adapted to be detachably secured to said frame, terminal depending portions on said members providing bearings for said drive wheels whereby a relatively high ground clearance and wide tread is provided, means actuable by the differential gearing to drive the drive wheels, and a secondary wheeled supporting means adapted to be detachably secured to the frame; the traction set including downwardly extending supporting members adapted to be detachably secured to said frame, bearings for said drive wheels provided by said downwardly extending members whereby a relatively narrower tread is provided, means actuable by the differential gearing to drive the drive wheels, and a secondary wheeled supporting means adapted to be detachably secured to the frame.

2. A convertible tractor having a power unit including power generating means, transmission, differential gearing and a frame therefor, and drive wheels, in combination with interchangeable sets of supporting members adapted to be demountably secured to said frame to provide either a cultivator form or a traction form; the cultivator set including a pair of tubular horizontal supporting members adapted to be detachably secured one to each side of said frame and each having a terminally depending portion, bearings in said portions for said drive wheels whereby a relatively high ground clearance and wide tread is provided, means actuable by the differential gearing to drive the drive wheels, a rearwardly extending horizontal supporting member detachably secured to the frame, and a trailer wheel secured to said rearwardly extending member; the traction set including a pair of rearwardly and downwardly extending supporting members adapted to be detachably secured to each side of said frame, bearings provided by the rearward portions of said members for said drive wheels whereby a relatively narrower tread is provided, means actuable by the differential gearing to drive the drive wheels, and a front axle and wheel assembly adapted to be detachably secured to the front of said frame.

3. A convertible tractor having a power unit including power generating means, transmission, differential gearing and a frame therefor, and drive wheels, in combination with interchangeable sets of supporting members adapted to be demountably secured to said frame to provide either a cultivator form or a traction form; the cultivator set including a pair of tubular horizontally extending supporting members adapted to be detachably secured in opposed axial alinement to said frame, a terminal depending arm secured to each member, a steering knuckle pivotally mounted on each arm, bearings for the drive wheels on said knuckles, whereby relatively high ground clearance and wide tread is provided, drive shafts actuable by said differential gearing and oppositely extending through said tubular supporting members, means joined to each shaft by a universal coupling to engage the drive wheels whereby the wheels may be differentially actuated, and a rearwardly and horizontally extending supporting member adapted to be detachably secured to said frame, a trailer wheel secured to said rearward member, and steering means connected to said steering knuckles whereby the tractor may be steered; the traction set including downwardly extending supporting members adapted to be detachably secured to said frame, bearings for said drive wheels provided by said downwardly extending members whereby a relatively narrower tread is provided, drive shafts actuable by said differential gearing and oppositely extending from said frame, means on each shaft to engage a drive wheel whereby each wheel may be differentially actuated, a front axle assembly adapted to be detachably secured to the front of said frame, steering knuckles pivotally carried by said axle, wheels mounted on said knuckles, and steering means connected to said steering knuckles whereby the tractor may be steered.

4. A convertible tractor comprising a frame, a power unit including power generating means, transmission and differential gearing and traction means in combination with interchangeable sets of supporting members adapted to be demountably secured to said frame to provide either a cultivator form or a traction form.

5. A convertible tractor comprising a frame, a power unit including power generating means, transmission and differential gearing and traction means in combination with interchangeable sets of supporting members adapted to be demountably secured to said frame, one set horizontally extending to provide a wide tread cultivator form and the other set horizontally terminating adjacent the frame side to provide a narrower tread traction form.

6. A convertible tractor comprising a frame, a power unit including power generating means, transmission and differential gearing and traction means in combination with interchangeable sets of supporting members adapted to be demountably secured to said frame, each set also having a pair of driving shafts adapted to be demountably secured to said differential gearing and opposedly to project from said frame, tubular portions provided by each set of supporting members adapted to receive therethrough said driving shafts, one set of shafts and supporting members horizontally extending from the frame side to provide a wide tread cultivator form and the other set horizontally terminating adjacent the frame side to provide a narrower tread traction form.

7. A convertible tractor comprising a frame, a power unit including power generating means, transmission and differential gearing and traction means in combination with interchangeable sets of supporting members adapted to be demountably secured to said frame and to said traction means to provide either a cultivator form or a traction form; the cultivator set including supporting members detachably secured to said frame and horizontally extending therefrom, bearings for said traction means on said horizontally extending members whereby a wide tread is provided, and means actuable by said differential gearing to drive the traction means; the traction set including supporting members adapted demountably to be secured to said frame and terminating adjacent the frame side, and bearings for said traction means on said supporting members whereby a relatively narrower tread is provided, and means actuable by said differential gearing to drive the traction means.

In witness whereof I have hereunto set my hand this 25th day of October 1919.

ELMER B. McCARTNEY.